(12) United States Patent
Bohlender

(10) Patent No.: US 8,637,796 B2
(45) Date of Patent: Jan. 28, 2014

(54) ELECTRICAL HEATING DEVICE AND HEAT GENERATING ELEMENT OF AN ELECTRICAL HEATING DEVICE

(75) Inventor: Franz Bohlender, Kandel (DE)

(73) Assignee: Eberspacher Catem GmbH & KG, Herxheim (DE)

( * ) Notice: Subject to any disclaimer, the term of this patent is extended or adjusted under 35 U.S.C. 154(b) by 434 days.

(21) Appl. No.: 12/969,974

(22) Filed: Dec. 16, 2010

(65) Prior Publication Data
US 2011/0147370 A1   Jun. 23, 2011

(30) Foreign Application Priority Data

Dec. 17, 2009 (EP) .................................... 09015650

(51) Int. Cl.
*H05B 3/10* (2006.01)
*F24H 3/02* (2006.01)

(52) U.S. Cl.
USPC ........... 219/553; 219/530; 219/532; 219/202; 219/504; 219/505; 219/552; 219/537; 219/548; 219/481; 219/510; 392/360; 392/361; 392/362; 392/363; 392/364; 392/365; 392/366; 392/367; 392/368; 392/369; 392/403; 337/405

(58) Field of Classification Search
USPC ............. 219/553, 530, 532, 202, 504–5, 552, 219/537, 548, 481, 510; 392/360–369, 403; 337/405
See application file for complete search history.

(56) References Cited

U.S. PATENT DOCUMENTS

| | | | |
|---|---|---|---|
| 5,377,298 A | | 12/1994 | Yang |
| 5,665,261 A | * | 9/1997 | Damsohn et al. ............. 219/504 |

FOREIGN PATENT DOCUMENTS

| | | |
|---|---|---|
| EP | 1 432 287 A1 | 12/2002 |
| EP | 1 515 587 A1 | 9/2003 |
| EP | 1 564 503 A1 | 2/2004 |
| WO | 2007/049746 A1 | 10/2006 |

OTHER PUBLICATIONS

European Search Report Dated May 27, 2010 for European Patent Application Serial No. EP 09 01 5650.

* cited by examiner

*Primary Examiner* — Shawntina Fuqua
(74) *Attorney, Agent, or Firm* — Boyle Fredrickson, S.C.

(57) ABSTRACT

An electrical heating device includes at least one heat generating element and at least one heat emitting element having opposed surfaces that abut the heat generating element. The heat generating element includes at least one PTC heating element having strip conductors on both sides of it for the electrical supply of the PTC heating element At least one of the strip conductor is provided with at least one contact projection which protrudes beyond a PTC heating element locating face formed on the strip conductor. Also disclosed is a heat generating element having at least one strip conductor provided with at least one contact projection.

14 Claims, 4 Drawing Sheets

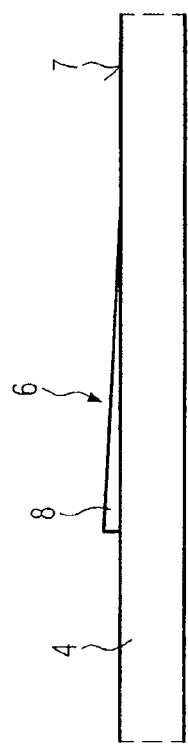
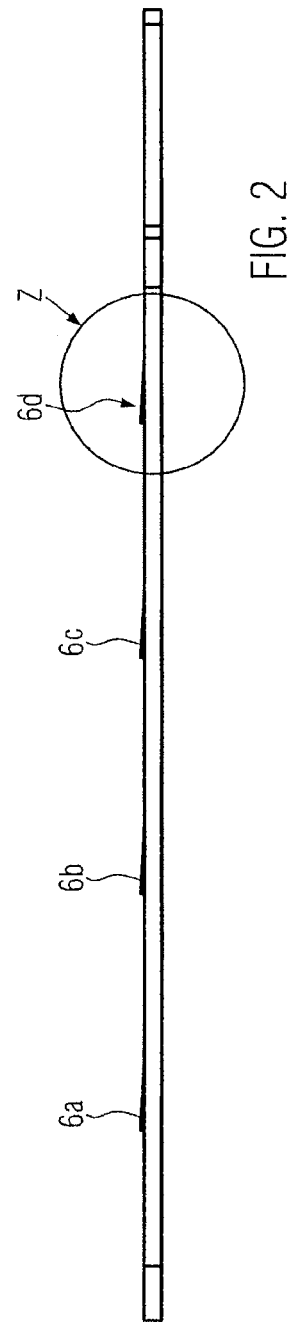

ELECTRICAL HEATING DEVICE AND HEAT GENERATING ELEMENT OF AN ELECTRICAL HEATING DEVICE

BACKGROUND OF THE INVENTION

1. Field of the Invention

This invention relates to an electrical heating device with at least one heat generating element with at least one PTC element and with strip conductors contacting on both sides for supplying electrical current to the PTC element and with heat emitting elements which form opposing surfaces for contacting the heat generating element.

2. Description of the Related Art

Electrical heating devices of this nature are generally known and are particularly employed as heating devices in motor vehicles.

For example, EP 2 109 345 A1 can be regarded as class-forming, which discloses an electrical heating device for heating air and with which the heat emitting elements are formed as lamellar layers, which contact the heat generating elements through the intermediate positioning of an insulating film, i.e. which form the opposing surface for abutting the heat generating element. In this state of the art the heat generating element comprises a two-part housing, whereby each housing part encloses one of the two strip conductors. The two housing parts are situated mutually opposite with the intermediate positioning of a compressive sealing means. In this way, through a pressure acting from outside, for example the pressure of a spring which holds a layer structure of a plurality of layers of heat emitting and heat generating elements under tension in a frame, the possibility is created of the strip conductors directly contacting the PTC element so that current is reliably introduced into the PTC element and heat can be coupled out of the PTC element.

In another state of the art, EP 1 931 176 A1, the heat generating element is located in a U-shaped pocket open on one side and is wedged in the pocket with a wedge element. The wedge element contacts the heat generating element through the intermediate positioning of an electrical insulating layer to electrically decouple it from the walls forming the pocket. The walls are normally part of a standardised housing which comprises a heating chamber through which the fluid to be heated can pass. The wedge element introduced into the pocket should in this respect ensure that the strip conductors abut the PTC elements with a good contact. With the previous state of the art the heat generating element comprises a plurality of PTC heating elements provided directly adjacently.

With a further state of the art according to EP 1 574 791 A1 a plurality of heat emitting elements are provided in a frame layered with a plurality of heat generating elements. The heat emitting elements comprise vanes which essentially extend transversely to the layers of the layer structure. The layer structure is held in a frame under spring tension. The heat emitting elements are aluminium extruded sections which directly abut the PTC heating elements. Accordingly, with this previously known state of the art, which can also be regarded as class-forming, the strip conductors are formed, for the purposes of this invention, by the mutually opposing outer surfaces of the heat emitting elements, between which the PTC heating elements are enclosed and electrically supplied.

With a further state of the art given in EP 0 899 985 the PTC heating elements are present between extruded sections which have holes for the passage of the fluid to be heated. The extruded sections are clamped together, enclosing the PTC heating elements in order to achieve as good an electrical contact as possible.

PTC heating elements, which are used in the electrical heating devices mentioned above, are ceramic components that are manufactured by sintering. Normally the oppositely situated surfaces provided for receiving the electrical supply are metallised, for example by means of screen printing. Both the application of the metallisation and the production of the PTC heating elements of this nature can lead to the thickness of the PTC heating elements varying. With a permanently specified alignment of the strip conductors certain differences in thickness already lead to the problem that individual PTC elements, which are arranged adjacently in a plane and between strip conductors, do not sufficiently contact the strip conductors. This can lead to spark formation and thermal disturbances within the electrical heating device which do not just impair the service life of the electrical heating device, but also detrimentally affect a controller assigned to the electrical heating device, in particular when an electronic controller with power switches is involved.

SUMMARY OF THE INVENTION

The object of this invention is to provide an electrical heating device which can be operated with increased safety and/or service life.

To solve this object the invention suggests providing at least one of the strip conductors with at least one contact projection which extends beyond a locating face for the PTC heating element formed by the strip conductor. Through this at least one contact projection a defined abutment against the PTC element is possible.

The invention can be realised with just a single PTC heating element, which is contacted at least on one side by one, or preferably a plurality of contact projections. The invention is based on the deliberation that differences in thickness with the PTC heating elements, which even with deviations of about 0.03 mm lead to conduction problems in feeding the power current to the PTC heating element, are prevented in that a contact projection ensures current transfer.

The contact projection is here formed such that a defined electrical contact between the inner surface of the strip conductor and the PTC heating element can take place via the contact projection.

From the invention it can be deduced that the current transfer into the PTC element no longer occurs over an area via a strip conductor extending parallel to the PTC element, in particular in the form of a sheet metal strip, but rather in any case can also occur through one or a plurality of contact projections, which extend beyond the otherwise flat locating face formed by the strip conductor. These contact projections can, for example, be formed by shaping a sheet metal strip forming the strip conductor. During shaping, a projection can, for example, be bent out of the plane of the sheet metal strip by deforming the sheet metal strip which then contacts the PTC heating element to establish a defined current transfer. Here, the base of the sheet metal strip can provide a certain elasticity in order for the contact projection to contact the PTC heating element.

Accordingly, it is preferable that the contact projection contacts the PTC heating element without being joined to the PTC heating element directly. Rather the contact projection preferably contacts the PTC element under tension; in particular it contacts the metallisation applied to the PTC element.

According to a preferred further development of the invention, the contact projection is formed by the cutting and bending of a sheet metal strip forming the strip conductor to extend beyond the locating face of the sheet metal strip and is formed on the sheet metal strip as one part. A preferred further development of this nature provides from the start a simple assignment between the position of the PTC heating element and the position of the sheet metal strip which is normally held in a housing or the like in a predetermined position which also positions the at least one PTC heating element. Furthermore, the strip conductor can be easily handled during the production of the electrical heating device, because the contact projection and the strip conductor are formed as one part. This applies all the more to the case where a plurality of contact projections are formed.

With regard to the application of the electrical heating device, in particular with heating devices which are operated with high-voltage currents, and according to a further development of the invention, it is suggested that the heat generating element is provided abutting the opposing surface at least on one side with the intermediate positioning of an electrically insulating layer. This insulating layer can for example be a ceramic insulating layer. The insulating layer can also be constructed with a plurality of layers, for example, from a ceramic layer with a plastic film, for example in polyamide or polyimide, laminated onto it. Here, often the relatively brittle ceramic layer directly abuts the strip conductor which is normally formed smooth and extensive, despite the provision of one or a plurality of contact projections on the side facing away from the PTC heating element. Thus, the ceramic layer is supported extensively and accordingly relatively breakproof.

The invention proves to be particularly effective with an electrical heating device with a plurality of PTC heating elements which are provided mutually adjacently, preferably directly mutually adjacently, whereby each of the PTC heating elements is assigned at least one contact projection. It has in fact been found that high heating power levels and an efficient PTC heating device cannot be achieved with a single-part PTC heating element. Instead, a plurality of PTC heating elements should be provided in a common housing directly and mutually adjacent and also between two strip conductors which extend essentially in parallel. Since these strip conductors always have a certain stiffness, with a powerful electrical heating device of this nature, due to the thickness differences mentioned above, sometimes the strip conductors cannot be contacted with the required accuracy.

With regard to the best possible contacting, according to a further development of the invention, it is suggested that contact projections are provided on both sides of the PTC element(s). Provided that a plurality of PTC heating elements are electrically supplied via a common strip conductor, at least one contact projection is preferably provided on both sides for each PTC heating element.

The invention can be realised in a particularly effective way for an electrical heating device which at least comprises a U-shaped recess open at the end, in which the PTC heating element, together with the sheet metal strip abutting it are introduced with a wedge element with which the layered structure, consisting of the at least two sheet metal strips and the at least one PTC element, is held clamped in the U-shaped recess. The wedge element can here be formed from an insulating material. Normally, an insulating layer is provided on the outer side of the sheet metal strip, preferably of both sheet metal strips, to electrically decouple the PTC heating element from the U-shaped recess and thus from the housing of the electrical heating device. In this preferred further development the U-shaped recess protrudes into a heating chamber and is open on one side, namely to a chamber of the electrical heating device, which normally comprises the control device, but also at least strip conductors with which normally a plurality of PTC heating elements provided in a U-shaped recess are grouped and/or electrically connected to switching elements of a control device, as disclosed in the European patent application EP 1 872 986 A1. With this heating device the opposing surfaces, which are formed by the oppositely situated inner sides of the open U-shaped recess, are provided rigidly with respect to one another. Also the wedge element can only cause clamping of the PTC heating elements with respect to adjacent sheet metal strips in the U-shaped recess. However, even with a low angular offset the clamping force does not act evenly over the complete surface of the PTC heating elements, so that the accompanying problem of uneven and inaccurate contacting can be countered by the contact projection.

According to a preferred further development of the invention the sheet metal strips are each attached to a housing by extrusion-coating the sheet metal strips with a plastic forming the relevant housing part, whereby the housing parts are joined to enclose at least one PTC heating element. In doing this, joining is preferably carried out such that the two housing parts can be moved in a plane transverse to the planes of the sheet metal strips in order to directly transfer the compression force, which acts on the sheet metal strips from outside, to the PTC heating element. Principally, the intention is to transfer the compression force at the phase boundary between the sheet metal strip and the PTC heating element. The housing part can be formed in a manner as described in EP 1 921 896 A1. The two housing parts can here be formed in particular with regard to the U-shaped recess open on one side, so that they can be introduced into the U-shaped recess. When extrusion-coating the sheet metal strips, insulating layers abutting on the outside can also be joined to the relevant housing part.

Furthermore, the invention provides a heat generating element with at least one PTC element and strip conductors extensively abutting it on both sides for the electrical supply of the PTC heating element wherein at least one of the strip conductors has at least one contact projection, which protrudes beyond a locating face formed by the strip conductor for the PTC heating element.

This heat generating element ensures contacting of the relevant PTC element despite any dimensional deviations. The heat generating element can be provided in any housing or in any surroundings. Improved contacting between the two strip conductors and the at least one PTC heating element is produced if only a single PTC heating element is provided. It is particularly advantageous if a plurality of PTC elements are provided between two strip conductors extending essentially in parallel, of which at least one, preferably both are provided with contact projections. Here, preferably at least one contact projection should be assigned to each individual PTC heating element.

Further details and advantages of the invention can be taken from the following description of an embodiment in conjunction with the drawing.

BRIEF DESCRIPTION OF THE DRAWINGS

The drawings show the following:

FIG. 2 a sheet metal band of the embodiment illustrated in FIG. 1 in a side view;

FIG. 3 the detail Z according to FIG. 2 shown enlarged;

DETAILED DESCRIPTION OF THE PREFERRED EMBODIMENTS

Figure 1:
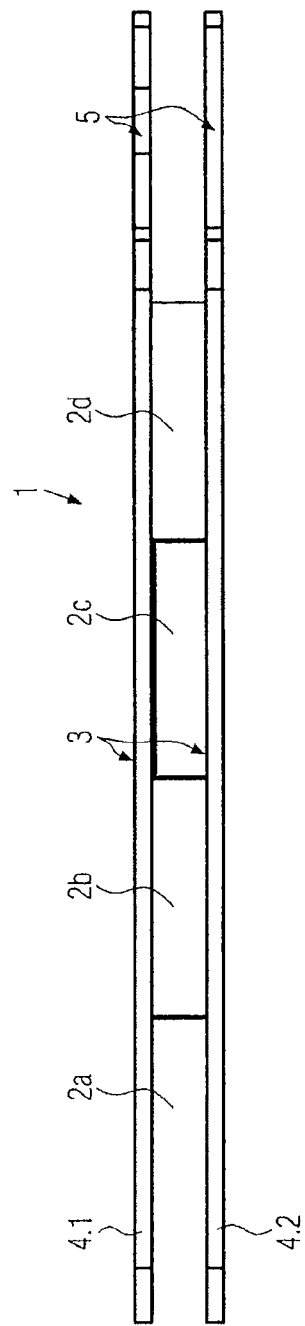
FIG. 1 a first embodiment of a heat generating element of the invention in a side view.

FIG. 1 shows a side view of an embodiment of a heat generating element 1 with a plurality of PTC heating elements 2 provided adjacently in a plane and which are formed as ceramic parts with non-identical thickness, so that the individual PTC heating elements sometimes have a spacing to at least one of the two sheet metal strips 4 provided as strip conductors 3. Accordingly for example, for the PTC heating element with the reference numeral 2c a small gap appears between an upper sheet metal strip 4.1 and the surface of the corresponding PTC heating element 2c.

The sheet metal strips 4 are formed on the right side of the drawn illustration according to FIG. 1 by punching to give the contact lugs 5. The heat generating element illustrated in FIG. 1 can, for example, be electrically connected to a conductor board via recesses using these contact lugs 5.

The arrangement illustrated in FIG. 1 is generally known (cf. for example, EP 1 931 176 A1 or EP 0 899 985 A1). However, it differs from the previously known configurations by details which are clearly shown as examples in FIGS. 2 and 3.

FIGS. 2 and 3 show the lower sheet metal strips illustrated in FIG. 1 with the reference numeral 4.2. For each of the PTC heating elements 2a to 2d contact projections 6 are formed on the sheet metal strips 4.2. These contact projections 6 protrude slightly beyond a flat locating face 7 formed by the sheet metal strips 4.2 for the PTC heating elements 2. The individual PTC heating elements 2 can abut this locating face 7. However, they do not need to abut there to contact sufficiently.

The contact projections 6 are formed by cutting a segment 8 from a central section of the sheet metal strip 4.1 followed by bending of the segment 8. In this way the free ends of the contact projections 6 extend beyond the locating face 7 by a maximum and at least by an amount which is greater than the conceivable differences in thickness of the PTC heating element 2. The thickness corresponds to the extrapolated direction of the PTC heating elements 2 between the two sheet metal strips 4.

Figure 4:
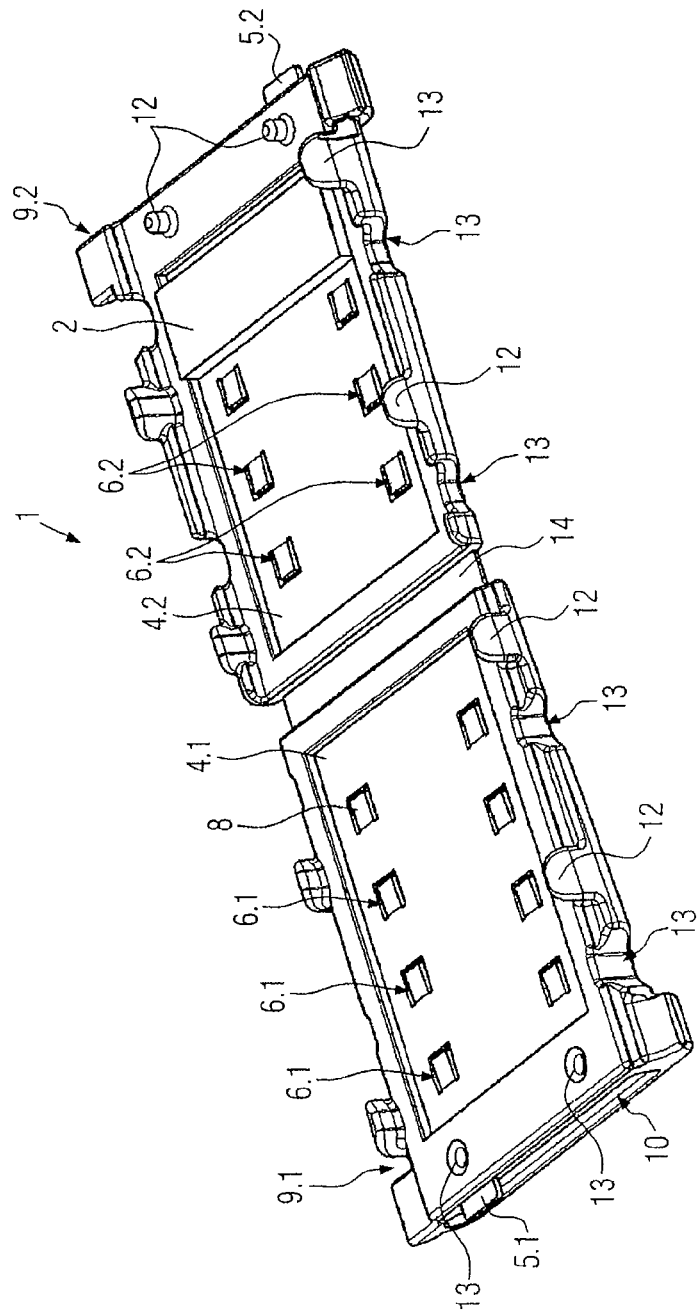
FIG. 4 a second embodiment of a heat generating element in a perspective side view.

As can be taken from FIG. 4, the segment 8 is cut from the material of the sheet metal strip 4 by a U-shaped groove. For each PTC heating element 2 two contact lugs 5, which abut one of the PTC heating elements 2 on one side, are provided adjacently at the same height. On the oppositely situated side two contact projections 6.2 are similarly provided on the other sheet metal strip 4.2 for each PTC heating element 2.

The embodiment of a heat generating element shown in FIG. 4 has two housing parts 9.1, 9.2, each of which is manufactured in plastic by injection moulding, preferably in a heat-resistant, relatively flexible plastic, such as for example silicone. During the injection moulding of the housing parts 9.1, 9.2 the sheet metal strips 4, previously prepared by means of punching and bending, are placed in the injection mould. With the embodiment illustrated in FIG. 4 electrical insulating layers abut the outside of the sheet metal strips 4 on the outside of the sheet metal strips 4 which cover the outsides of the sheet metal strips 4 with the housing closed. The sheet metal strips 4 and the insulating layers preferably have the same dimension. During the injection moulding of the housing parts 9.1 or 9.2 the edges of the insulating layers and the strip conductors 3 are sealed in by the molten plastic. After solidification of the plastic the sheet metal strips 4 and the insulating layers are each mounted on a housing part 9.1 or 9.2.

Figure 5:
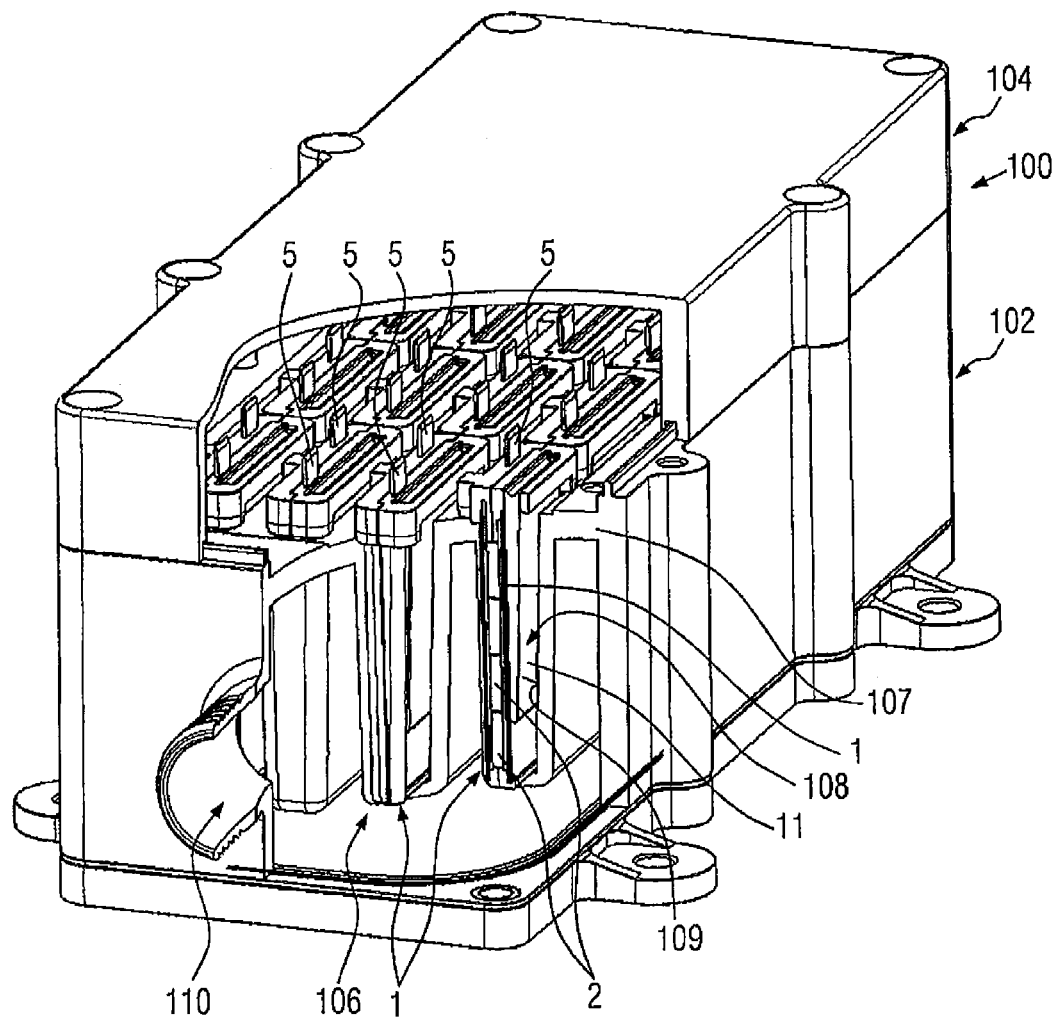
FIG. 5 an embodiment of an electrical heating device.

At its upper front end the housing part 9.1 forms an insertion opening 10 for a wedge element 11 illustrated in FIG. 5. Both housing parts 9.1, 9.2 have a contact lug 5.1 or 5.2 protruding from them. Furthermore, the two housing parts 9.1 and 9.2 have locking sections 12, 13 which mutually engage and are provided on the edge of the relevant housing parts 9.1 and 9.2. In this way there is the possibility of the housing parts 9.1 and 9.2 being movable with respect to one another, however only in the direction of a plane which extends essentially transversely to the plane of the sheet metal strips 4.

Between the two housing parts 9.1 and 9.2 a film hinge 14 is provided which permanently joins the two housing parts 9.1 and 9.2. The housing formed by the two housing parts 9.1 and 9.2 is thus a single part. During assembly the housing is first injection moulded in the previously described manner together with the sheet metal strips 4 and the electrical insulating layers. Then the housing is fitted with the PTC heating elements 2 by placing the PTC heating elements 2 on one of the sheet metal strips 4.2. Four PTC elements 2 are placed directly and mutually adjacent on the sheet metal strips 4.2. Then the other housing part 9.1 is placed onto the housing part 9.2 by pivoting about the film hinge 14. The locking sections 12, 13 interact such that this position is secured relative to one another.

FIG. 5 illustrates an embodiment of an electrical heating device 100 with a housing base 102 which is closed off by a housing cover 104. The housing base 102 is formed trough-shaped and encloses a heating chamber 106 which is closed off at the top by a partition wall 107. The partition wall 107 is interspersed with U-shaped recesses 108 which are open at the top and towards the housing cover 104. With the illustrated embodiment a plurality of adjacent recesses 108 are provided extending essentially over the complete longitudinal extent of the housing base 102. A plurality of the heat generating elements 1, which are illustrated in FIG. 4, are located one behind the other in each of the recesses 108. The recesses 108 form opposing surfaces 109 for the heat generating element. These heat generating elements 1 are clamped by the wedge element 11 in the U-shaped recesses 108 so that good thermal conduction is provided between the walls of the U-shaped recesses 108, i.e. between the housing base 102 and the heat generating element 1. Furthermore, the respective strip conductors 3 are forced against the PTC heating elements 2. With dimensional deviations in the thickness direction between individual PTC heating elements 2 and with an abutting sheet metal strip 4 on an outer surface of one of the PTC heating elements 2 this does not lead however to inadequate contacting of another PTC heating element 2, because in all cases the contact projections 6 protrude beyond the sheet metal strips 4 with their locating faces 7 in the direction of the PTC heating element 2, thus ensuring a good electrical contact.

Details of the embodiment illustrated in FIG. 5 are by the way disclosed in EP 1 931 176 A1 which originates from the applicant and to the disclosure of which reference is made and the disclosure of which is included in the disclosed content of this application through this reference. Of particular importance is the fact that the flow of fluid to be heated enters the heating chamber 106 at an end side thereof through a fluid inlet opening 110 and leaves the heating chamber 106 at an end side opposite to that being provided with the fluid inlet opening 110. The fluid of the medium to be heated, in particular water, is such that the main flow direction within the housing base 102 is in parallel to the longitudinal extension of the recess 108 and perpendicular to a direction of inserting the heat generating elements 100 and the wedge element 11 into said recess 108.

The invention is not restricted to the illustrated embodiment. In the same way it is possible to provide contact projections on heater elements which are intended for heating air in electrical heating devices. Insofar as the above has been applied to sheet metal strips which form the strip conductors, it is pointed out that only the functional realisation of strip conductors matters from which the contact projections 6 protrude in the direction of the PTC element. Contact protrusions of this nature can be formed by a heat emitting element itself or they can also be provided between the marginal areas of a heat emitting element and the heat generating element assigned to this heat emitting element. Apart from wedging the PTC heating elements 2 between the two strip conductors, it is also possible to clamp the PTC heating elements elastically using springs (cf. for example, EP 1 370 117 A2).

LIST OF REFERENCE NUMERALS

| | |
|---|---|
| 1 | Heat generating element |
| 2 | PTC heating element |
| 3 | Strip conductors |
| 4 | Sheet metal strips |
| 5 | Contact lug |
| 6 | Contact projections |
| 7 | Locating face |
| 8 | Segment |
| 9.1 | Housing part |
| 9.2 | Housing part |
| 10 | Insertion opening |
| 11 | Wedge element |
| 12 | Locking section |
| 13 | Locking section |
| 14 | Film hinge |
| 100 | Electrical heating device |
| 102 | Housing base |
| 104 | Housing cover |
| 106 | Heating chamber |
| 107 | Partition wall |
| 108 | Recess |
| 109 | Opposing surface |
| 110 | Fluid inlet opening |

The invention claimed is:

1. An electrical heating device comprising:
   at least one heat generating element including at least one PTC heating element, strip conductors contacting opposed sides of the PTC heating element for the electrical supply of the PTC heating element; and
   heat emitting elements which form opposing surfaces for the abutment of the heat generating element, wherein at least one of the strip conductors has a locating face that locates the PTC heating element and that has at least one contact projection which extends beyond the locating face and that abuts an associated PTC heating element.

2. An electrical heating device according to claim 1, wherein the contact is elastically tensioned against the PTC heating element.

3. An electrical heating device according to claim 2, wherein each of the strip conductors comprises a sheet metal strip, and wherein the contact projection is formed by cutting and bending the sheet metal strip so as to protrude beyond the locating face.

4. An electrical heating device according to claim 1, wherein at least one of the opposing surfaces of the heat generating element abuts one of the strip conductors with an electrical insulating layer positioned therebetween.

5. An electrical heating device according to claim 1, wherein a plurality of mutually adjacent PTC heating elements are provided, and wherein at least one contact projection is assigned to and abuts each of the PTC heating elements.

6. An electrical heating device according to claim 1, wherein at least one contact projection is provided on each side of the PTC heating element.

7. An electrical heating device according to claim 3, wherein two sheet metal strips are attached to a housing which forms a recess for receiving the at least one PTC heating element, wherein each of the opposing surfaces of the heat emitting element is formed by a wall of a U-shaped recess which is open on one side and which protrudes into a heating chamber through which heated fluid can pass, and wherein the heat generating element is clamped in the U-shaped recess by at least one wedge element.

8. An electrical heating device according to claim 7, wherein each of the sheet metal strips is attached to a housing part by extrusion-coating of the sheet metal strip with a plastic which forms the corresponding housing part, the housing parts being joined together and enclosing the PTC heating element.

9. An electrical heating device according to claim 7, wherein the heat generating element abuts at least one of the opposing surface of the heat emitting element with the intermediate positioning of an electrical insulating layer.

10. A heat generating element comprising:
    at least one PTC element and strip conductors extensively abutting opposed sides of the PTC heating element for the electrical supply of the PTC heating element, wherein at least one of the strip conductors has a locating face that locates the PTC heating element and has at least one contact projection, which protrudes beyond the locating face.

11. A heat generating element with according to claim 10, wherein each of the strip conductors comprises a sheet metal strip, and wherein the contact projection is formed by cutting and bending the sheet metal strip so as to protrude beyond the locating face.

12. An electrical heating device comprising:
    at least one heat generating element, the heat generating element including at least one PTC heating element and first and second strip conductors contacting opposed sides of the PTC heating element for the supply of electrical power the PTC heating element; and
    first and second heat emitting elements between which heat generating element is located, wherein at least one of the first and second strip conductors has a locating face that faces the PTC heating element and has at least one contact projection which extends beyond the locating face toward the PTC heating element and abuts an associated PTC heating element.

13. An electrical heating device according to claim 12, wherein the contact projection is elastically tensioned against the PTC heating element.

14. An electrical heating device according to claim 12, wherein each of the strip conductors is formed from a sheet metal strip, and wherein the contact projection is formed by cutting and bending the sheet metal strip so as to protrude beyond the locating face toward the PTC heating element.

* * * * *